United States Patent [19]

Rohde et al.

[11] 4,009,641

[45] Mar. 1, 1977

[54] COMPACT POWER STEERING GEAR

[75] Inventors: Robert P. Rohde; John H. Christ; Stanley E. Anderson, Jr., all of Saginaw, Mich.

[73] Assignee: General Motors Corporation, Detroit, Mich.

[22] Filed: Nov. 14, 1975

[21] Appl. No.: 631,839

[52] U.S. Cl. .............................. 91/375 A; 92/169
[51] Int. Cl.² .......................................... F15B 9/10
[58] Field of Search .............. 91/375 A, 380, 375 R

[56] References Cited

UNITED STATES PATENTS

| | | | |
|---|---|---|---|
| 2,936,643 | 5/1960 | Smith et al. | 91/380 |
| 3,630,233 | 12/1971 | Miyamoto | 91/375 A |
| 3,739,868 | 6/1973 | Maekawa | 91/380 |
| 3,885,456 | 5/1975 | Forster | 91/380 |
| 3,921,669 | 11/1975 | Goff | 91/375 A |
| 3,935,790 | 2/1976 | Goff | 91/375 A |

FOREIGN PATENTS OR APPLICATIONS 966,431  8/1964  United Kingdom ............. 91/375 A Primary Examiner—Paul E. Maslousky
Attorney, Agent, or Firm—Charles R. White

[57] ABSTRACT

The piston nut of this compact steering gear telescopes over the valve assembly and into an adjuster plug at opposite ends of its stroke to provide for a foreshortened gear housing. The piston nut screw is connected to the valve assembly and the input stub shaft by a special retainer means to prevent their axial separation to maintain the integrity of the mechanical drive of the piston nut. The adjuster plug provides a thrust bearing adjustment, a closure for the gear and a travel stop for the piston nut when telescoping therein. The stepped bore in the housing provides for improved assembly of the parts from one end of the housing through the opening for the adjuster plug.

5 Claims, 2 Drawing Figures

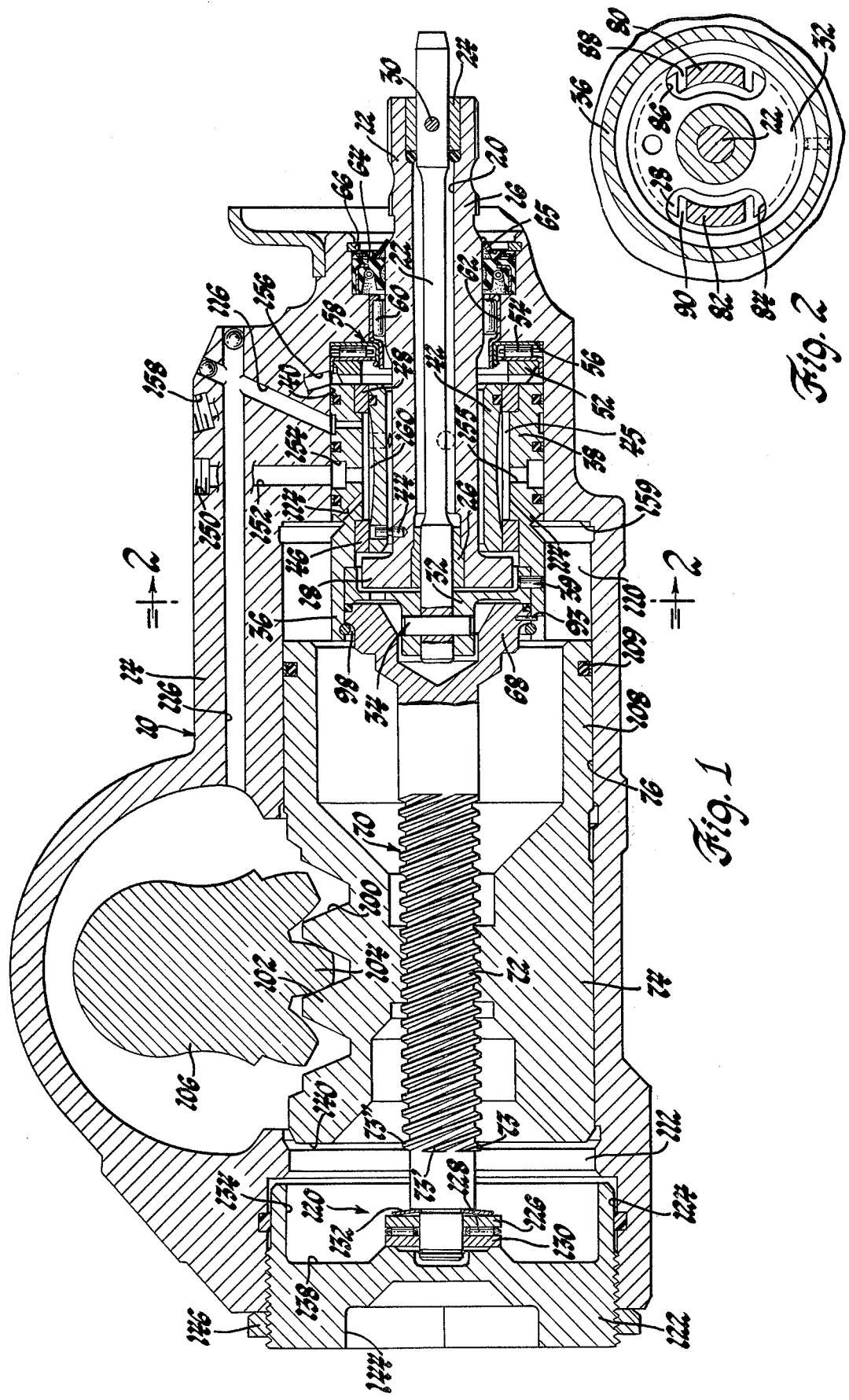

COMPACT POWER STEERING GEAR

This invention relates to power steering and more particularly to a new and improved compact and light weight power steering gear for vehicles.

The power steering gear of this invention comprises a piston nut movably mounted in a housing for turning a gear sector operatively connected to a pitman shaft for vehicle steering purposes. The piston nut may be mechanically driven when there is a loss in hydraulic pressure by a screw threaded therethrough which is mechanically coupled to a valve assembly by a lost motion device and by a special retainer ring that prevents the axial separation of the screw and valve assembly to maintain the integrity of the mechanical drive. This feature provides for a simplified and lighter weight housing since the partition walls of the prior art construction preventing axial separation of the screw and valve are eliminated. Furthermore, this invention features the overall foreshortening of the unit since the piston nut telescopes over the valve at one end of the stroke and into the adjuster plug at the other end of the stroke. The adjuster plug provides a closure for the gear and a stop for the piston nut. Thrust bearings are disposed between the adjuster plug and one end of the screw for ready inspection and replacement if necessary. The housing has a single three step bore and the components of the steering gear can be readily preassembled and inserted into the housing. The piston nut screw of the preferred embodiment of this invention has a multi-start threading which provides for improved drive of the piston nut with minimal lash and further provides for a small diameter screw and piston nut. Additionally, the multi-start screw as compared to a similar single start screw arrangement provides for the improved hydraulic sealing of the two-pressure chambers in the unit provided by the piston nut slidably mounted therein.

It is a feature, object and advantage of this invention to provide a new and improved light-weight power steering gear which features the improved mechanical connection of the screw with the valve assembly used to control the flow of pressure fluid to and from the expansible and contractible chambers formed by the piston nut and gear housing.

Another feature, object and advantage of this invention is to provide a power steering gear having a new and improved connection between the piston nut actuating screw and the valve assembly to prevent their axial separation to thereby maintain the integrity of the mechanical drive from a gear input to a gear output.

Another feature, object and advantage of this invention is to provide a new and improved power steering gear that incorporates a hydraulically operated piston which is telescopically mounted with respect to structures within the gear housing to provide for a shortened housing.

Another feature, object and advantage of this invention is to provide new and improved power steering components which lend themselves to be readily assembled in a subassembly and then installed into a simplified housing from one end thereof.

Another feature, object and advantage of this invention is the provision of a new and improved power steering gear in which an elongated screw extends through and is drivingly connected to a piston nut and has an outer end disposed against end support means and an inner end secured by connector means to an input driven valve element that maintains the drive of the screw with or without the end support means.

These and other features, objects and advantages of this invention will become more apparent from the following detailed description and drawings in which:

FIG. 1 is a side view of a power steering gear with certain parts in section and certain other parts in elevation.

FIG. 2 is a sectional view taken generally along lines 2—2 of FIG. 1.

Turning now in more detail to the drawing, there is shown in FIG. 1 a power steering gear 10 having an elongated stub shaft 12 extending into steering gear housing 14. The stub shaft has a generally cylindrical body 16 extending from outside of the housing 14 to an interior position terminating in an annular head portion 18. The stub shaft 12 further has an axial passage 20 which receives a torsion bar 22 extending therethrough and which is supported for twisting movement therein by bearings 24 and 26. The outer end of torsion bar 22 is secured by pin 30 to the stub shaft while the inner end is fastened to an annular cap 32 by pin 34. The cap 32 has an outer rim that closely fits within the inner end 36 of a cylindrical valve body 38 and is secured thereto by pin 39. Valve body 38 extends axially in the housing 14 and is supported for turning movement with respect to valve spool 42 in a bore 40 formed in the housing. Valve spool 42 is a generally cylindrical member that is secured to the stub shaft 12 by pin 44 and thus turns when the stub shaft is turned. Annular members 46 and 48, disposed at the ends of valve spool 42 and between the valve spool 42 and the valve body 38 close off the ends of internal valve body slots 45. The valve body and valve spool form a valve assembly to control the fluid flow in the power steering gear as described in U.S. Pat. No. 3,022,772 issued Feb. 27, 1962 to P. B. Zeigler et al. for Rotary Power Steering Valve with Torsion Bar Centering.

A washer-like spacer 52 mounted in bore 40 transmits thrust loads imposed on the valve body 38 to a thrust bearing 54 that seats on a transverse shoulder 56 formed in the housing at the end of bore 40. Thrust bearing 54 forms part of a bearing assembly 58 that incorporates a radial bearing 60 interlocked with the thrust bearing 54. By having these two bearings interlocked together as a unit, their assembly in the power steering gear 10 is facilitated. Radial bearing 60 is operatively mounted between stub shaft 12 and the cylindrical wall of a bearing bore 62 to support the stub shaft 12 for turning movement in the housing 14. A suitable seal 64 disposed outboard of radial bearing 60 and around stub shaft 16 prevents leakage of fluid from the housing 14. This seal is maintained in position by an annular dust seal 65 and a snap ring 66 mounted in the end of housing 14.

Nested within the inner end 36 of valve body 38 and inboard of torsion bar cap 32 is an enlarged annular head 68 of a screw or worm 70. The screw 70 has a centralized shank 72 with multiple start threads 73, 73' and 73''. The shank 72 extends axially in the power steering unit 10 and is threaded through a piston nut 74 that is mounted for sliding movement in a piston bore 76 formed in housing 14. The multiple start thread allows the employment of a smaller diameter screw and piston nut with improved strength as compared to prior art steering gear units with single start threads. To provide for the required travel of the nut and to have sufficient strength, the prior screw and piston nut comonents with single start leads were necessarily of large diameter. The multiple leads further reduce lash between the screw and piston nut and further provide improved sealing between the pressure chambers formed by the piston nut in the housing. The piston bore 76 is coaxial with the valve bore 40 and the bearing bore 62. The screw 70 is operatively connected to the stub shaft 12 by a lost motion connection illustrated in FIG. 2. As shown, the head 68 of the screw is formed with a pair of fingers 80 and 82 which project from the head 68 through arcuate openings 84 and 86 in the torsion bar cap 32 and into the arcuate recesses 88 and 90 formed in the annular head portion 18 of the stub shaft 12. Normally the FIGS. 80 and 82 are centered by torsion bar 22 as shown in FIG. 2. The clearance or lash between the projections and the edges of the stub shaft head forming slots 88 and 90 provide for the limited relative turning movement between the stub shaft and the screw until a positive metal to metal drive occurs.

As previously pointed out, the inner end of the torsion bar is connected by cap 32 and pin 39 to the valve body 38. The valve body is drivingly connected to the head 68 of the screw 70 by a pin and slot connection illustrated at 93. With one end of the torsion bar connected to a reaction load represented by screw 70 and parts driven thereby and the other end connected to the input represented by the stub shaft, a construction is provided which permits the torsion bar to twist as the input or stub shaft is turned. The lost motion connection provides for the initial relative turning of the valve pool and the valve body to control the flow of hydraulic fluid in the unit to provide for the powered steering of the dirigible wheels of a vehicle. In the event of a drop in fluid pressure to the point where hydraulic power steering is reduced or eliminated, mechanical drive takes place with the rapid diminution of the lash between the head 18 of stub shaft 12 and the fingers 80 and 82 of head 68 of screw 70 for mechanical steering of the vehicle as described in the above-identified patent.

The head 68 of the screw 70 fits closely into the end 6 of the valve body 38 and is axially secured thereto by a retainer ring 98 which effectively prevents the axial separation of the screw from the valve body and the parts connected thereto. This is of particular importance in that the integrity of the mechanical drive between the stub shaft and the screw is maintained for the drive of the piston nut by the screw and the mechanical steering of the vehicle. This light weight yet sturdy connection eliminates the requirements for the enlarged bulkheads or other type fasteners providing this junction in the prior art devices.

The piston nut 74 has a piston nut rack 100 with teeth 102 which mesh with the teeth 104 of a gear sector 106 which is rotatably mounted in the steering gear housing 14 and which is operatively connected to a pitman shaft not shown. With such construction the stroking movement of the piston in the bore 76 will provide for the rotation of the gear sector which, being operatively connected to the pitman shaft and dirigible wheels of the vehicle turns the vehicle. As indicated above, piston nut movement is accomplished by the hydraulic or mechanically powered movement of the piston. The piston 74 has a cylindrical axially-extending skirt 108 with annular seal 109 and is mounted in the housing to provide for separate hydraulic chambers 110 and 112 which are respectively operatively connected to the valve assembly through fluid flow passages 114 and 116. With the controlled thread form of the multi-start thread connection between the screw and piston nut leakage between chambers 110 and 112 is reduced to a point where auxiliary seals between these two elements are not needed.

While screw thrust loads directed toward the valve assembly are imposed on bearing 54, thrust loads from the screw directed away from the valve assembly are taken by a thrust bearing assembly 120. As shown, this thrust bearing assembly is mounted at the small or outer end of the screw 70 and is supported in an adjuster plug 122 that is threaded into an enlarged opening 124 formed in the end of housing 14. The thrust bearing assembly 120 includes an inner race 126 seated on a shouldered end portion of screw 70, a needle bearing assembly 128 disposed between the inner race and an outer race 130. Also, there is a disc spring 132 operatively mounted between the inner race 126 and the screw 70 that provides a spring force yieldably loading the thrust bearings and maintaining the worm and valve assembly in position. This spring force can be adjusted by screwing the adjuster plug 122 into or out of housing 14.

The adjuster plug has a recess 134 into which the end of the piston nut 74 telescopes when it moves to the left. The telescoping of the piston nut 74 into the adjuster plug at one end and over a substantial portion of the valve at the other end of the nut provides for substantial foreshortening of the unit as compared to prior art units thereby providing important savings in size and weight. In addition to this feature, the adjuster plug 122 has an inner face 138 that contacts the end 140 of the piston nut 74 to limit the stroke of the piston nut in moving to the left. The adjuster plug has a polygonal opening 144 in the outer face that receives a suitable tool which can be turned to adjust the plug to the desired position. After being adjusted, the plug 122 is held in position by a lock nut 146 which is threaded on the adjuster plug against the end of housing 14.

The enlarged opening 124 in the housing facilitates the assembly of the components in the unit. Assuming that seal 64 and bearing assembly 58 have been installed in the housing, the torsion bar, the stub shaft, the valve assembly, the screw, and the piston nut are assembled together and can be easily installed as a subassembly into housing 14 through the opening 124. After installation the adjuster plug 122 is threadedly advanced to a point where the thrust bearings are sufficiently preloaded by the spring 132.

The valve assembly controls the supply and exhaust of pressure fluid from chambers 110 and 112 for stroking the piston nut 74 to different positions as determined by the amount of rotation of the vehicle steering wheel and the stub shaft operatively connected thereto. Since the ports, grooves, fluid passages and the hydraulic operation of the valve assembly of the preferred embodiment of this invention are the same as the above referenced U.S. Pat. No. 3,022,772, whose disclosure is hereby incorporated by reference, further detailed description of the valve and its operation is not necessary.

Generally, however, the valve assembly is supplied with pressure fluid from a power steering pump not shown through an inlet port 150 in housing 14. This port is connected by passage 152 to an annular pressure groove 154 formed in the valve body. Groove 154 is connected to elongated passages 160 in the valve spool by radial passages 155 under certain operating conditions described below. Fluid is exhausted from the valve assembly through passage 156 formed in the housing 14 to exhaust port 158. For a right hand turn the stub shaft 12 is turned in a clockwise direction by appropriate action of the steering wheel. This action turns the valve spool 42 in a clockwise direction relative to the valve body 38. Under these conditions, the valve supplies pressure fluid to the passages 160 and 116 which connects the valve with chamber 112. The valve assembly under these conditions opens chamber 110 to the exhaust passage 156. In consequence, a pressure differential is created across the piston nut 74 in favor of the right turn chamber 112 so that the desired fluid assist is given to the piston nut 74. Movement of the piston nut imparts a counterclockwise rotation to the pitman arm cross shaft attached to the gear sector so that right turn powered steering is accomplished. Maximum right turn steering is accomplished with the skirt 108 of the piston nut telescoped over the end 36 of valve body 38 and in end engagement with the radial wall 159 of housing 14.

The outer valve body 38 being connected to the screw 70 to turn therewith seeks constantly to catch up with the valve spool 42 drivingly connected to the stub shaft. On cessation of steering effort at the steering wheel the valve spool and the valve body immediately become centered by the spring force of the torsion bar. This results in the qualization of fluid pressure in the two chambers or the maintenance of just the amount of pressure differential to match the dynamic steering and aligning forces coming back from the dirigible wheels, so that further powered steering motion is terminated. Left hand turn action is opposite to that described in connection with right hand turn and accordingly further description is not believed necessary.

In the event of loss of lower thrust bearing support to the screw with an accompanying loss of hydraulic pressure for powered assist, it will be appreciated that mechanical steering is maintained with the retainer ring 98 preventing the axial separation between the worm and the valve assembly and stub shaft components. The retainer ring in effect eliminates the prior art bulkheads used to prevent axial separation and provides effective weight reduction and simplification of housing design. By having the power steering nut telescope over a portion of the valve assembly at one end of the stroke and into the adjuster nut at the other end of the stroke, a substantial foreshortening of the power steering unit is obtained. With this compact design, a power steering gear is provided that maximizes use of the limited space available for vehicle steering and effective weight reduction is simultaneously achieved for improved economy.

The new adjuster plug for this invention has multiple functions providing a closure for the housing, an adjustment to adjust the thrust bearings to accommodate the thrust of the screw and prevent axial play while also providing a travel stop for the piston. A further feature of this invention is the improved housing construction having adjacent bearing shoulders for the thrust and radial bearings which permits the integrated thrust and radial bearing assembly to be used in this unit. In addition to the above, there is improved assembly provided by this construction. The screw shaft 70 is readily connected to the valve assembly by telescoping the screw shaft head 68 into cylindrical end 36 of the valve body. The retainer ring 98 which is a partially circular spring member with facing free end portions, is constricted for quick installation in the valve body. After being released from the constricting force the retainer ring springs outwardly into engagement with an associated internal groove in the valve body to prevent axial separation of the screw shaft and valve. The piston nut 74 can then be installed on the screw and the thrust bearing assembly 120 positioned on the terminal end thereof. Subsequently the assembled components are installed into the gear housing from one end thereof and adjuster nut 122 is screwed into position to close the housing.

It will be further appreciated that the worm and ball screw assemblies as well as the piston nut seal means of the prior art have been replaced by new and improved construction. Thus this invention, as opposed to the prior art devices, has an actuator or screw shaft 70 that extends completely through the piston nut and is operatively connected to thrust bearings at both ends thereof. Furthermore, the inner seal between the two chambers 110 and 112 of this invention is constituted solely by the multi-start threaded connection between the screw and piston nut.

While a preferred embodiment of this invention has been shown and described to illustrate the invention, other embodiments will become apparent to those skilled in the art. Accordingly, the scope of this invention is set forth in the following claims.

What is claimed is:

1. A power steering gear unit comprising a housing, an input member operatively mounted for turning movement in said housing and extending outside one end thereof, an output member operatively mounted for turning movement in said housing and extending outwardly therefrom, piston means mounted for longitudinal sliding movement in said housing and cooperating therewith to provide first and second expansible and contractible fluid pressure chambers therein, gear means drivingly connecting said piston means to said output member so that said output member turns in response to sliding movement of said piston means, valve means in said housing operatively connected to said input member and having a connection to a source of pressurized hydraulic fluid for selectively supplying and exhausting pressurized fluid to and from said chambers to hydraulically move said piston means and said connected output member to predetermined positions as controlled by the amount of movement of said input member, axially extending rotatable actuator means extending completely through said piston means and operatively connected thereto for mechanically moving said piston means in said housing, means operatively drivingly connecting said input member to said actuator member so that said actuator member can be turned by said input member, said actuator means having a head portion at one end thereof extending into one end of said valve means, and retainer ring means mounted within said valve means and engaging said head portion to prevent the axial separation of said actuator means and said valve means so that said input can turn said valve means and said actuator member.

2. A power steering gear comprising an elongated housing, a cylindrical bore formed with large, intermediate and small diameter steps extending in series from one end of said housing to the other end thereof, an input member operatively mounted for turning movement in the small step of said bore and extending outside from one end of said housing, an output member operatively mounted for turning movement in said housing, piston means mounted for longitudinal sliding movement in said large step of said bore and cooperating therewith to provide first and second expansible and contractible fluid pressure chambers therein, gear means drivingly connecting said piston means to said output member so that said output member turns in response to sliding movement of said piston means, valve means rotatably mounted in said intermediate step of said bore, torsion bar means extending into said valve means and terminating between the ends of said housing and in said intermediate step of said bore for operatively connecting said valve means to said input member, said valve means being connected to a source of pressurized hydraulic fluid and being actuated by said input member and said torsion bar means for selectively supplying and exhausting pressurized fluid to and from said chambers to hydraulically move said piston means and said connected output members to predetermined positions as controlled by the amount of movement of said input member, an elongated and rotatable actuator means rotatably mounted in said housing for moving said piston means, said actuator means having a head portion extending into said valve means and having a shaft portion extending axially therefrom completely through said piston means, fastener means carried by said head portion for securing said head portion to said valve means, drive means operatively connecting said piston means and said actuator means so that rotation of said actuator means moves said piston means to thereby move said output means, adjustable closure means removably connected to said housing at one end thereof for closing the large diameter step of said bore and providing a bearing support for one end of said actuator means, said closure means being recessed to telescopically receive one end of said piston means when stroked a predetermined distance in a first direction in said large step of said bore and said piston being recessed to telescopically fit directly over said valve means when stroked a predetermined distance in a direction opposite to said first direction in said large step of said bore whereby a foreshortened and lightweight steering gear is provided.

3. A power steering gear comprising an elongated one-piece housing having a cylindrical bore therethrough formed with a plurality of varying diameter steps, an input member operatively mounted for turning movement in a small diameter step of said bore and extending outside from one end of said housing, an output member operatively mounted for turning movement in said housing, piston means mounted for longitudinal sliding movement in a large diameter step of said bore and cooperating therewith to provide first and second expansible and contractible fluid pressure chambers therein, gear means drivingly connecting said piston means to said output member so that said output member turns in response to sliding movement of said piston means, valve means rotatably mounted in an intermediate diameter step of said bore, torsion bar means extending into said valve means and terminating in said intermediate step of said bore for operatively connecting said valve means to said input member, said valve means being connected to a source of pressurized hydraulic fluid and being actuated by said input member and said torsion bar means for selectively supplying and exhausting pressurized fluid to and from said chambers to hydraulically move said piston means and said connected output member to predetermined positions as controlled by the amount of movement of said input member, an elongated and rotatable screw means rotatably mounted in said housing for moving said piston means, said screw means having a large diameter head portion extending into said valve means and having a small diameter shaft portion extending axially therefrom completely through said piston means, releasable fastener means carried by said head portion for drivingly securing said screw means to said valve means and for preventing the axial separation thereof, meshing tooth means operatively connecting said piston means and said screw means so that rotation of said screw means moves said piston means to thereby move said output means, adjustable closure means threadedly connected to said housing for closing the other end of said housing and providing an adjustable bearing support for one end of said screw means, said closure means being recessed to telescopically receive one end of said piston when stroked a predetermined distance in a first direction in said large diameter step of said bore, and said piston means being recessed to telescopically extend directly over said valve means when stroked from a position axially spaced from said valve means and in a direction opposite to said first direction in said large diameter step of said bore whereby a foreshortened and lightweight steering gear is provided.

4. A power steering gear comprising a housing having an elongated bore formed with small, intermediate and large diameter steps, an input member operatively mounted for turning movement in the small step of said bore and extending outside one end of said housing, an output member operatively mounted for turning movement in said housing, piston means mounted for longitudinal sliding movement in the larger step of said bore and cooperating therewith to provide first and second expansible and contractible fluid pressure chambers therein, gear means drivingly connecting said piston means to said output member so that said output member turns in response to sliding movement of said piston means, valve means operatively mounted in the intermediate step of said bore and terminating in the larger step of said bore, said valve means being operatively connected to said input member and having a connection to a source of pressurized hydraulic fluid for selectively supplying and exhausting pressurized fluid to and from said chambers to hydraulically move said piston means and said connected output member to predetermined positions as controlled by the amount of movement of said input member, elongated rotatable screw means having one end projecting into and extending axially from said valve means through said piston means and operatively connected thereto for mechanically moving said piston means, and closure means adjustably mounted in said housing for closing said opening at the large diameter step of the bore and for providing a travel stop for said piston means, first thrust bearing means operatively disposed between said closure means and one end of said actuator means and second thrust bearing means operatively between said valve means and said housing for respectively receiving the thrust loads from said piston means directed toward the opposite ends of said housing.

5. A power steering gear comprising a housing, an elongated uninterrupted bore in said housing having a small, an intermediate and a large diameter step arranged in series therein, an input member operatively mounted for turning movement in the small step of said bore and extending outside one end of said housing, an output member operatively mounted for turning movement in said housing, piston means mounted for longitudinal sliding movement in the large step of said bore and cooperating therewith to provide first and second expansible and contractible fluid pressure chambers therein, mechanical means drivingly connecting said piston means to said output member so that said output member turns in response to longitudinal movement of said piston means in said large step of said bore, cylindrical valve means rotatably mounted in the intermediate step of said bore and terminating in the larger step of said bore, torsion bar means extending through said valve means drivingly connecting said valve means to said input member, said valve means having a connection to a source of pressurized hydraulic fluid for selectively supplying and exhausting pressurized fluid to and from said chambers to hydraulically move said piston means and said connected output member to predetermined positions as controlled by the amount of movement of said input member, elongated rotatable screw means operatively mounted solely in said large diameter step of said bore having one end projecting into and extending axially from said valve means completely through said piston means and operatively connected thereto for mechanically moving said piston means, and closure means adjustably mounted in said housing for closing said large diameter step of said bore at the other end of said housing and for providing a travel stop for said piston means, first thrust bearing means operatively disposed between said closure means and one end of said actuator means and second thrust bearing means operatively between said valve means and said housing for respectively receiving the thrust loads from said piston means directed toward the opposite ends of said housing.

* * * * *

UNITED STATES PATENT AND TRADEMARK OFFICE
CERTIFICATE OF CORRECTION

PATENT NO. : 4,009,641
DATED : March 1, 1977
INVENTOR(S) : Robert P. Rohde et al It is certified that error appears in the above—identified patent and that said Letters Patent are hereby corrected as shown below:

Column 3, line 14, "FIGS." should read -- fingers --.

Column 5, line 28, "qualization" should read -- equalization --.

Signed and Sealed this sixteenth Day of August 1977

[SEAL]

Attest:

RUTH C. MASON
Attesting Officer

C. MARSHALL DANN
Commissioner of Patents and Trademarks